US008381093B2

(12) United States Patent
Mohan (10) Patent No.: US 8,381,093 B2
(45) Date of Patent: Feb. 19, 2013

(54) EDITING WEB PAGES VIA A WEB BROWSER (75) Inventor: Bulusu Krishna Mohan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1457 days.

(21) Appl. No.: 11/634,407

(22) Filed: Dec. 6, 2006

(65) Prior Publication Data

US 2008/0141116 A1    Jun. 12, 2008

(51) Int. Cl.
G06F 17/28 (2006.01)
(52) U.S. Cl. ...................................... 715/234
(58) Field of Classification Search ............ 715/234
See application file for complete search history.

(56) References Cited

U.S. PATENT DOCUMENTS

| | | | |
|---|---|---|---|
| 5,845,299 | A | 12/1998 | Arora et al. |
| 6,026,433 | A | 2/2000 | D'Arlach et al. |
| 6,038,668 | A | 3/2000 | Chipman et al. |
| 6,263,352 | B1 | 7/2001 | Cohen |
| 6,529,910 | B1 | 3/2003 | Fleskes |
| 6,546,397 | B1 | 4/2003 | Rempell |
| 6,601,057 | B1 | 7/2003 | Underwood et al. |
| 7,062,492 | B1 | 6/2006 | Graham |
| 7,167,903 | B2 | 1/2007 | Percival |
| 8,020,094 | B2 | 9/2011 | Mohan |
| 2001/0020244 | A1 | 9/2001 | Belanger et al. |
| 2001/0045963 | A1 | 11/2001 | Marcos et al. |
| 2002/0046245 | A1 | 4/2002 | Hillar et al. |
| 2002/0188636 | A1 * | 12/2002 | Peck et al. ............... 707/530 |
| 2003/0158854 | A1 * | 8/2003 | Yoshida et al. ........... 707/101 |
| 2003/0204810 | A1 | 10/2003 | Dam et al. |
| 2003/0237046 | A1 * | 12/2003 | Parker et al. ............. 715/513 |
| 2003/0237052 | A1 * | 12/2003 | Danielsson et al. ....... 715/513 |
| 2004/0230900 | A1 | 11/2004 | Relyea et al. |
| 2004/0255233 | A1 | 12/2004 | Croney et al. |
| 2005/0198042 | A1 * | 9/2005 | Davis ....................... 707/10 |
| 2005/0229101 | A1 | 10/2005 | Matveyenko et al. |
| 2006/0026503 | A1 | 2/2006 | Bartosh et al. |
| 2006/0161880 | A1 | 7/2006 | Saad et al. |
| 2006/0248442 | A1 | 11/2006 | Rosenstein et al. |
| 2007/0180471 | A1 | 8/2007 | Unz |

(Continued)

FOREIGN PATENT DOCUMENTS

GB    2397915 A1    8/2004
JP    2006-106954    4/2006

(Continued)

OTHER PUBLICATIONS

International Search Report from corresponding International Application No. PCT/US2007/084740, application filed Nov. 15, 2007; search report dated Mar. 12, 2008.

(Continued)

*Primary Examiner* — Laurie Ries
*Assistant Examiner* — Tionna Smith (57) ABSTRACT A browser-based web authoring tool that enables locally editing and rendering web pages comprising style sheets. One illustrative embodiment is directed to a browser-based web authoring tool that may edit a style sheet to convert it to an inline style block. The inline style block is then inserted into a web page, replacing a reference to the style sheet. In this way, as the page is edited the web page may be rendered via the browser without repeatedly transferring a style sheet from the web server.

20 Claims, 6 Drawing Sheets

U.S. PATENT DOCUMENTS

| | | |
|---|---|---|
| 2007/0299985 A1 | 12/2007 | Craig et al. |
| 2010/0235806 A1 | 9/2010 | Mohan |

FOREIGN PATENT DOCUMENTS

| | | |
|---|---|---|
| JP | 2008-521147 | 6/2008 |
| KR | 10-0583517 | 5/2006 |
| KR | 10-2007-0121798 | 12/2007 |
| KR | 10-2009-0012989 | 2/2009 |
| WO | WO 2004006132 | 1/2004 |

OTHER PUBLICATIONS

International Search Report from corresponding International Application No. PCT/US2007/084761, application filed Nov. 15, 2007; search report dated Mar. 19, 2008.

Website: "Asbru Web Content Editor," available at http://www.asp.net/community/control-gallery/Item.aspx?i=620, describing software submitted to website on Aug. 24, 2008. Downloaded Jan. 29, 2009, pp. 1-3.

Website: "First Look at Using Expression Blend with Silverlight 2—ScottGu's blog," available at http://weblogs.asp.net/scottgu/archive/2008/02/28/first-look-at-using-expression-blend-with-silverlight-2.aspx. pp. 1-61. First published Feb. 28, 2008, some content added later. Retrieved on Sep. 24, 2009.

Website: "Free Silverlight Controls and Tools for Brighter Websites," available at http://www.webresourcesdepot.com/free-silverlight-controls-and-tools-for-brighter-websites/. Downloaded Jan. 29, 2009, pp. 1-11.

Website: "IncrediFlash Website Template 1.0," available at http://www.freedownloadscenter.com/Web_Authoring/Multimedia_Web_Authoring_Tools/IncrediFlash_Website_Template.html, describing software submitted to website on Aug. 19, 2008. Downloaded Jan. 21, 2009, pp. 1-2.

Website: "Microsoft Expression Blend 2 Features," available at http://www.microsoft.com/expression/features/default.aspx?key=blend. Downloaded Jan. 29, 2009, pp. 1-6.

Website: "Silverlight 2 Release Candidate Now Available," available at: http://weblogs.asp.net/scottgu/archive/2008/09/25/silverlight-2-release-candidate-now-available.aspx. pp. 1-46. First published Sep. 25, 2008, some content added later. Retrieved on Jan. 21, 2009.

Website: "Silverlight Tutorial Part 7: Using Control Templates to Customize a Control's Look and Feel—ScottGu's Blog," available at http://weblogs.asp.net/scottgu/pages/silverlight-tutorial-part-7-using-control-templates-to-customize-a-control-s-look-and-feel.aspx. pp. 1-12. First published Feb. 22, 2008, some content added later. Retrieved on Sep. 24, 2009.

Website: "VeIndia.com—Rich Internet Applications and Solutions Provider," available at http://veindia.com/index.php/VeIndia/microsoft-silverlight-based-services.html. Downloaded Mar. 19, 2009, pp. 1-5.

Written Opinion from International Application No. PCT/US2007/084740, application filed Nov. 15, 2007; Written Opinion dated Mar. 12, 2008.

Written Opinion from International Application No. PCT/US2007/084761, applicaton filed Nov. 15, 2007; Written Opinion dated Mar. 19, 2008.

www-db.stanford.edu/~crespo/publications/webwriter/webwriter.ps, "WebWriter: A Browser-Based Editor for Constructing Web Applications," downloaded on Nov. 28, 2006.

http://developer/apple.com/internet/webcontent/iframe.html, "Remote Scripting with Iframe," downloaded on Nov. 28, 2006, pp. 1-11.

http://mdl.csa.com/partners/viewrecord/php?requester=gs&collection=TRD&recid=N9726977AH&q=remote+web+pages+editor&uid=1000214&setcookie=yes, "Creating Dynamic World Wide Web Pages by Demonstration," downloaded on Nov. 28, 2006, pp. 1-2.

International Search Report regarding Application No. PCT/US2010/026700 dated Sep. 30, 2010.

* cited by examiner

EDITING WEB PAGES VIA A WEB BROWSER

FIELD OF THE INVENTION

The present invention relates to methods and systems for editing web pages via a web browser.

BACKGROUND OF THE INVENTION

Various types of web page authoring tools exist. Some of these tools allow users to produce web pages in a "What You See Is What You Get" (WYSIWYG) mode, i.e. the user is able to see what the final product will look like in a browser while editing the page. Many of these tools must be installed on a user's computer, and require full local access to all functions used by the web pages being edited. For example, if a user wants to use a particular function in a web page, not only the web page authoring tool but also the library explaining how to implement the function must be installed on the user's computer.

Other web page authoring tools exist that are implemented via a web browser. These tools, however, have limited functionality compared to client-based tools. This stems, in part, from the restrictions that have been placed on web browsers given concerns regarding security and the possibility of unauthorized access to a computer through the web browser. Among these restrictions is a limit on what other data and facilities on the user's computer the browser can access. Libraries of the type used by many client-based tools often are restricted from being used by browser-based tools. Thus, conventional browser-based tools cannot replicate the richness of functionality available in client-based tools.

SUMMARY OF THE INVENTION

Embodiments of the present invention are directed to a browser-based web authoring tool that provides functionality that conventionally only has been provided by authoring tools that must be installed on a user's computer.

In one illustrative embodiment, a browser-based web authoring tool is employed to enable a user to edit web pages made up of a master page and one or more content pages. The editing and rendering of the master/content web pages is handled locally. Techniques are employed to identify areas of the web pages that correspond to master and content pages, such that when a user edits an element within an area, the browser-based web authoring tool can track whether the edit is made to the master page or one of the content pages.

Another illustrative embodiment is directed to a browser-based web authoring tool that employs an inline style block that can be rendered locally rather than a style sheet. The browser-based web authoring tool may edit a style sheet to convert it to an inline style block. The inline style block is then inserted into a web page, replacing a reference to the style sheet. In this way, as the page is edited (including edits to style) the web page may be rendered via the web browser without repeatedly transferring a style sheet from the web server. When the page is saved to the web server, the inline style block may be converted to a style sheet and a reference to the style sheet may be inserted into the web page.

DETAILED DESCRIPTION

Applicants have appreciated that web page authoring tools that must be installed on a user's computer require a great deal of both time and expense in installing and maintaining the system. The software needs to be purchased and installed on computers, and updates and upgrades need to be managed. Function and control libraries need to be purchased, installed, and similarly managed. Indeed, the computer itself needs to be purchased and upgraded to keep pace with the growing demand of the software on hardware resources.

Web-based authoring tools that allow the editing of a web page overcome many of these disadvantages, but Applicants have appreciated that conventional implementations have limited functionality.

For example, conventional web-based authoring tools have not been able to offer some functionality available in web programming languages such as ASP.NET, available from the Microsoft Corporation of Redmond, Wash. This functionality includes features such as master and content pages. One embodiment of the present invention is directed to a browser-based web authoring tool that enables the editing of web pages having master and content page functionality.

Another example of the limits of conventional browser-based tools is the treatment of style sheets. Style sheets must be downloaded each time a page is refreshed, resulting in transfer delays and an interrupted user experience. One embodiment of the present invention is directed to a browser-based web authoring tool that converts style sheets to an inline style block that can be rendered locally, thereby reducing transfer delays.

Controls are a further example of the limits of conventional browser-based tools. Controls, such as those offered by the ASP.NET web programming language, are conventionally implemented in libraries that must be installed on a user's machine before they can be used. Security restrictions, however, prevent these libraries from being run by a browser. One embodiment of the present invention is directed to a browser-based web authoring tool that enables web pages including controls to be edited without first installing the controls locally.

Figure 1:
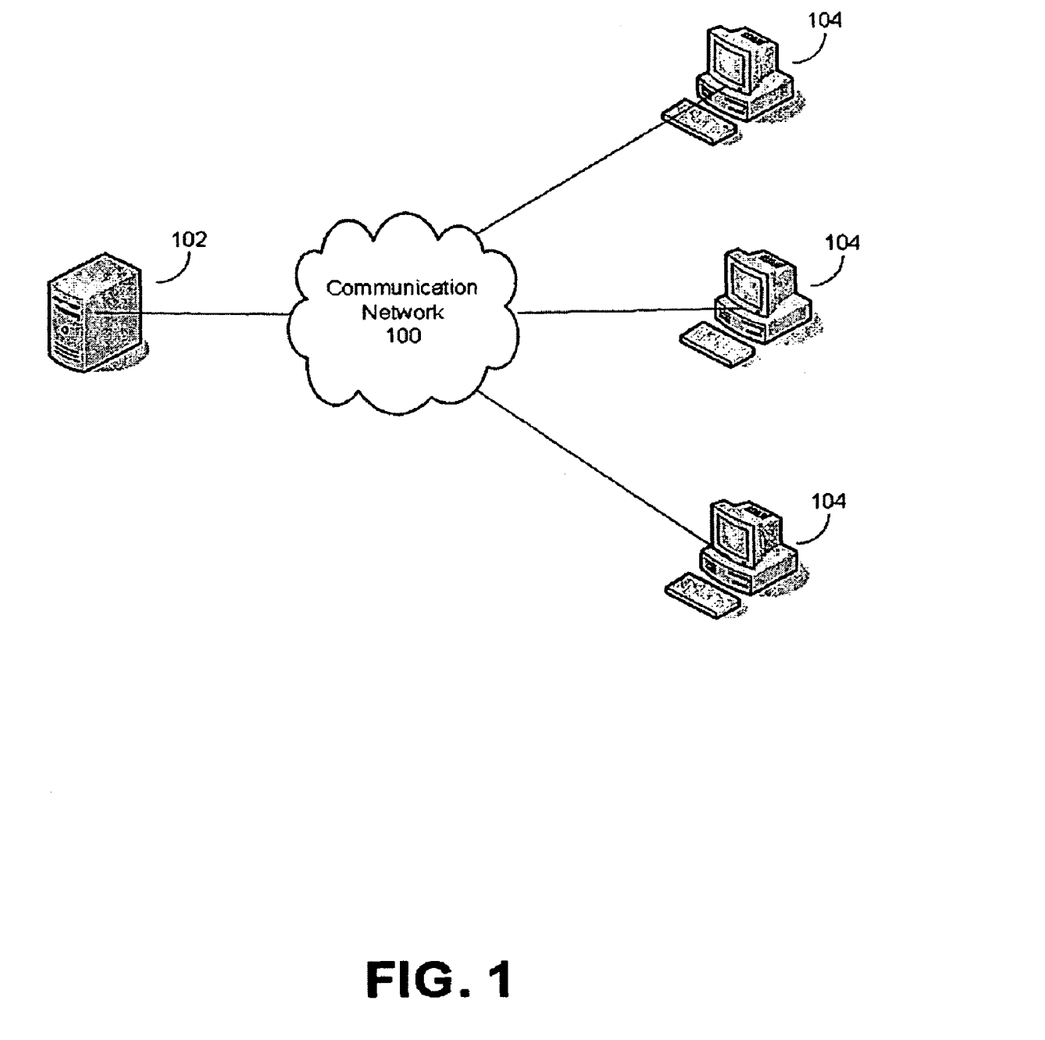
FIG. 1 is a diagram of an illustrative computer system environment in which embodiments of the invention may be implemented.

The aspects of the present invention described herein can be implemented on any of numerous computer system configurations and are not limited to any particular type of configuration. FIG. 1 illustrates an example of a computer system on which aspects of the invention can be implemented.

The computer system of FIG. 1 includes web server 102, communication network 100, and client terminals 104. The web server 102 comprises at least one processor, a network interface, and one or more computer-readable media storing computer-executable instructions for execution on the processor. Each client terminal 104 comprises at least one processor, a network interface, and at least one computer-readable medium storing computer-executable instructions for execution on the processor. Those instructions comprise a web browser. When a user of a client terminal 104 requests data from the web server using a web browser, the web server 102 transmits computer-executable instructions and other computer-readable data over the communication network 100. The web browser on the requesting terminal 104 receives the instructions, and accordingly renders data on the display of the terminal 104. Network 100 can be any suitable communication medium or media for exchanging data between a server and a client, including the Internet.

It should be appreciated that the invention is not limited to being practiced with the exemplary system shown in FIG. 1, and can be employed on systems employing any number of servers and/or clients.

Figure 2:
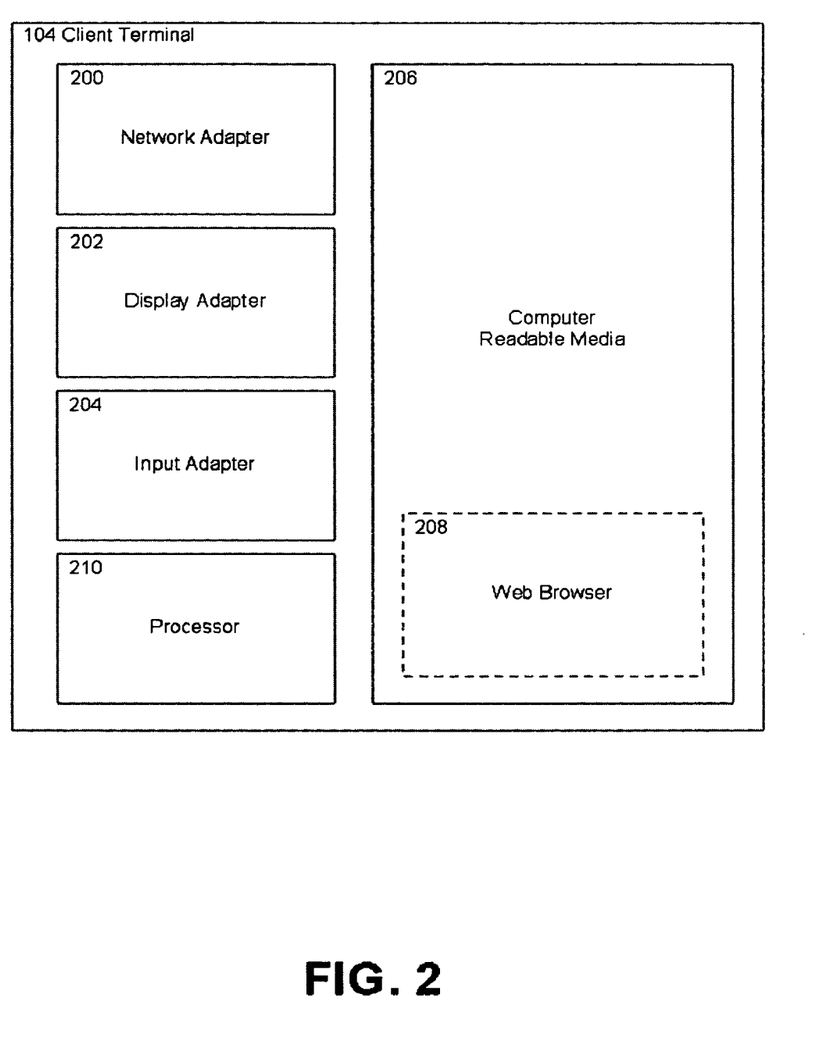
FIG. 2 is an exemplary client computer that may be used in accordance with embodiments of the invention.

FIG. 2 schematically shows a client terminal 104 that may be used in accordance with embodiments of the invention. FIG. 2 is intended to be neither a depiction of necessary components for a client terminal to operate with embodiments of the invention nor a comprehensive depiction. Client terminal 104 comprises a network adapter 200 to communicate with other devices connected to network 100, such as web server 102. The terminal 104 also comprises a display adapter 202 to display information to a user of the terminal and an input adapter 204 to receive commands from the user. Terminal 104 further comprises a computer-readable media 206 for storing data to be processed and/or instructions to be executed by a processor 210. These data and instructions can include a web browser 208 which may be used to send data to and receive data from web server 102. Processor 210 enables processing of data and execution of instructions. The data and the instructions may be stored on the computer-readable media 206 and may, for example, enable communication between components of the client terminal 104.

In accordance with some embodiments of the invention, data and instructions comprising a browser-based web authoring tool may be received from web server 102 by network adapter 200, then stored in the computer-readable media 206. From there, web browser 208 may access the data, display it to a user via display adapter 202, and await user command signals from input adapter 204.

It should be appreciated that embodiments of the present invention described herein are not limited to being practiced with the type of client computer illustrated in FIG. 2, and that embodiments of the invention can be practiced with any suitable processing device. The adapters 200, 202, and 204 may be implemented as any suitable hardware or software, or combination thereof, and may be implemented as a single adapter or multiple adapters. Similarly, computer-readable media 206 may be implemented as any medium or combination of media suitable for storing data and instructions for access by a processing device.

As discussed above, in one embodiment of the invention, a browser-based web authoring tool is provided that enables the editing of one or more web pages that employ master and content pages. As used herein, editing refers not only to modifying a previously-defined page, but also to creating a new page.

Figure 3A:
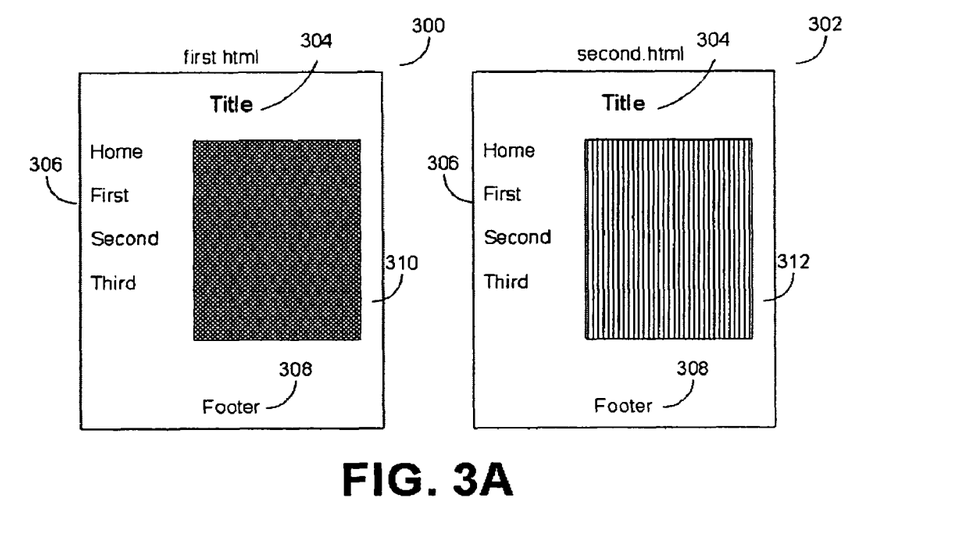
FIG. 3A is an example of a website having two web pages that do not use ASP.NET master and content pages.
Figure 3B:
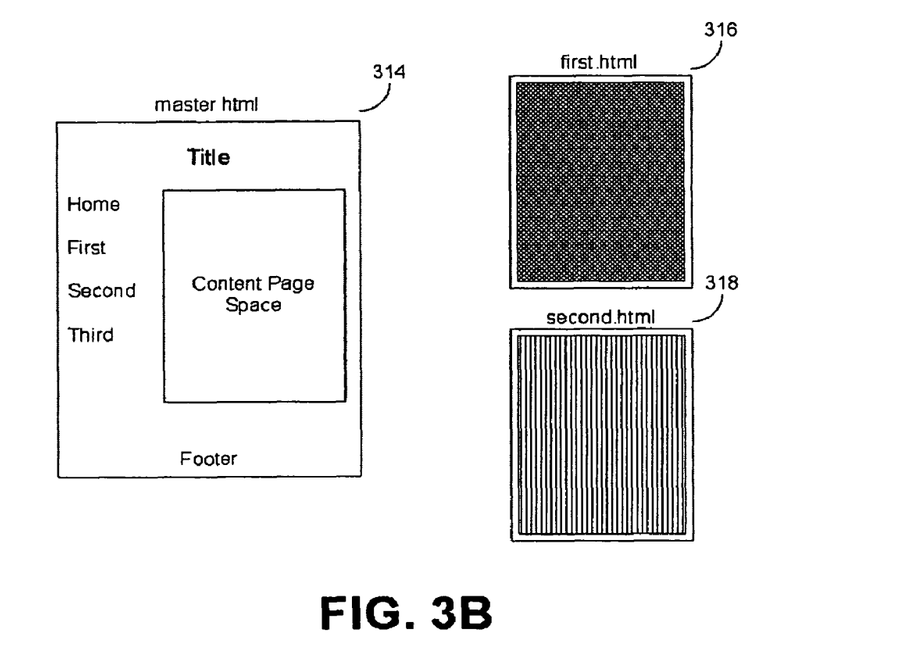
FIG. 3B illustrates the website of FIG. 3A but with the content separated into master and content pages.

A master page can be considered a template for content pages, i.e., a page with content that is common to a group of pages, but which has one or more holes that each can be filled with a content page. An illustrative example of a master/content page arrangement is described referring to FIG. 3A and FIG. 3B. The example of FIGS. 3A and 3B illustrates a website that has two web pages 300 and 302, wherein each web page has the same title 304 at the top, the same series of links 306 on the left side, and the same copyright footer 308. The only difference between the pages is the content in the middle of the page. FIG. 3A illustrates a conventional arrangement where each page is entirely separate, with separate HTML code that is not shared between pages.

FIG. 3B illustrates this website implemented using a master page 314 and two content pages 316 and 318. The master page 314 comprises the title 304, the series of links 306, and the footer 308 that are common to every page. Each content page comprises the content that would have been in the center of the page—elements 310 and 312 in the example of FIG. 3A. When a web browser user loads a web page comprising data from both a master and content page, the web server combines the data of the master and content pages, which are stored separately on the server, before rendering a complete page for the user on a display.

According to one embodiment of the present invention, a browser-based tool is employed that enables a user to implement master and content page functionality into one or more web pages. In accordance with this embodiment, the web server 102 stores code comprising browser-executable instructions that, when downloaded to and executed on a client terminal 104, enable a user of a web browser to manipulate a web page locally. This code may be transmitted to the client terminal 104 to enable a user to generate and manipulate a web page. In some embodiments, the code will be capable of generating locally, on the client, the Hypertext Markup Language (HTML) data describing the web page comprising the web-authoring tool's user interface, while in other embodiments the server may transmit both the code and the HTML data.

In one embodiment of the invention, JavaScript may be used as the code to implement the web authoring tool. It should be appreciated, however, that the specification of JavaScript as the code to implement any of the embodiments is merely illustrative. The browser-based web authoring tool can be implemented in any suitable manner, and is not limited to implementation in JavaScript or any other particular implementation technique. For ease of explanation, embodiments described herein may be described as being implemented by JavaScript, but it should be appreciated that alternate types of code can be employed, including other types of code that is stored by the web server 102, transmitted to the client terminal 104, and is interpretable by a web browser and capable of manipulating web page content.

In one embodiment, the code (e.g., JavaScript) executed by the browser-based tool may detect a user's request to implement master/content page functionality and may prompt the user to input options concerning the division between those pages (e.g., what areas constitute master page content and what areas constitute content page content). The code may divide the web page into specific sub-areas using any suitable technique, and may edit the data comprising the web page to designate the user's selected areas as belong to the master page or belonging to a particular content page. After the data has been edited, the code may trigger the browser to refresh the display such that the user is presented with an updated page reflecting the desired edits. As discussed, according to one embodiment of the invention, the editing and re-rendering is done entirely on the client-side, without communication with the web server.

In one embodiment, once master and content pages have been established by the user, techniques are employed to maintain a division between the pages as they are edited locally. Thus, even when the page is edited as a single entity, when it is written back to the server, the data respective to the master and content pages can be appropriately separated. This separation can be done locally, before transmission, or on the server, after transmission. As mentioned above, any suitable division techniques (e.g., identifying tags) may be employed to enable this parsing to occur.

In accordance with one embodiment, when a user edits an element inside the master page area, that change may be reflected in all pages using that master page data. Conversely, if a user edits a content page, the change may only be reflected in that specific content page and nowhere else. To identify where the change is to be reflected, the tool may examine information (e.g., tags) entered into the web page by the division techniques, or via any other suitable technique.

In one embodiment, all interaction with the page (e.g., editing and rendering) is kept on the client-side until the editing process is complete and the pages are stored on the web server 102. It should be appreciated, however, that the embodiment of the invention directed to a browser-based tool to edit web pages comprising a master and content page structure is not limited in this respect, and that such a tool may communicate with the web server at one or more points in the process of editing the web page.

Figure 4:
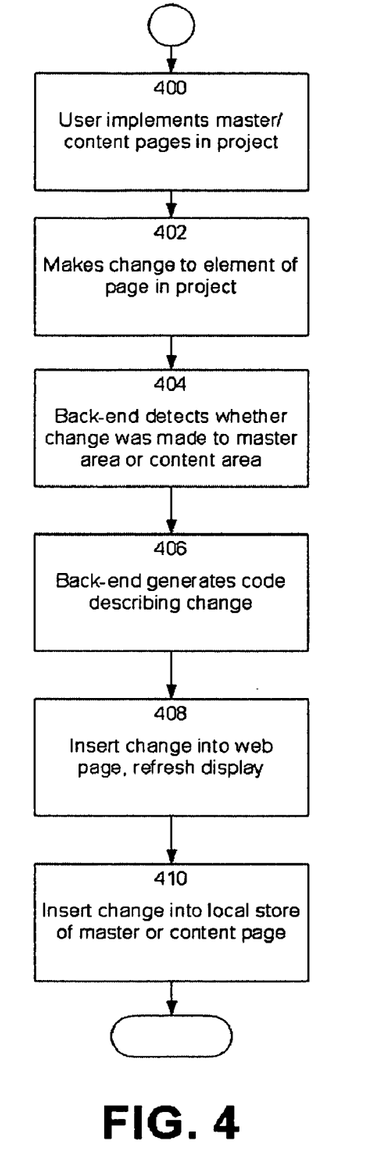
FIG. 4 is a flow chart of an illustrative process of creating and/or editing master and content pages via a browser using a web-based authoring tool in accordance with one embodiment of the invention.

An illustrative process for monitoring user interaction with a web page employing master and content pages is shown in FIG. 4. In act 400, a user elects to implement master and content pages into the web site. This can be done in any suitable manner (e.g., by selecting an appropriate command). The user may then specify (in any suitable manner) how the page is to be divided (e.g., where the boundaries lie between the master page and one or more content pages).

In act 402, the user changes (i.e., adds or modifies an existing) one or more elements on the web page. In act 404, the web authoring tool determines whether the change was made to an area designated as a content page or an area designated as a master page. Once that determination is made, the code (in act 406) generates the necessary information describing and implementing the desired change. This information is inserted into the front-end web page and the page is refreshed to display the changed page to the user in act 408.

In one embodiment, the web page is maintained locally as a single entity, with information demarcating which portions of the page comprise master and content pages. When the page is uploaded to the server, it can be parsed (locally or at the server) to create separate master and content pages for storage on the server, as discussed below.

In an alternative embodiment, the web page may be parsed and stored locally as separate master and content pages. In that embodiment, when uploaded to the server, the master and content pages can be uploaded separately. This embodiment is illustrated in FIG. 4, when (in act 410) the change is updated in the local store of the appropriate master and/or content page.

It should be appreciated that the sequence of acts in FIG. 4 is merely illustrative, and other sequences are possible. For example, an alternative embodiment may generate the code describing the change prior to identifying to which area of the page the change was made. As another example, the master and content pages are parsed and stored separately on the client terminal 104, and the browser-based web authoring tool may insert a change into these separately-stored pages before refreshing the display. In one embodiment of the invention that stores master and content pages separately on the client terminal 104, if a user elects to upload his data to the web server 102 for permanent storage, the local stores of data may be transmitted.

Embodiments of the invention may not locally store the master and content pages separately, instead holding only a single integrated set of data (i.e., the displayed page) on the client terminal 104. In one embodiment of the invention that stores only a single integrated set of data, if a user elects to save a web page to the web server 102, the web page may be parsed on the client terminal 104 before being transmitted.

Figure 5:
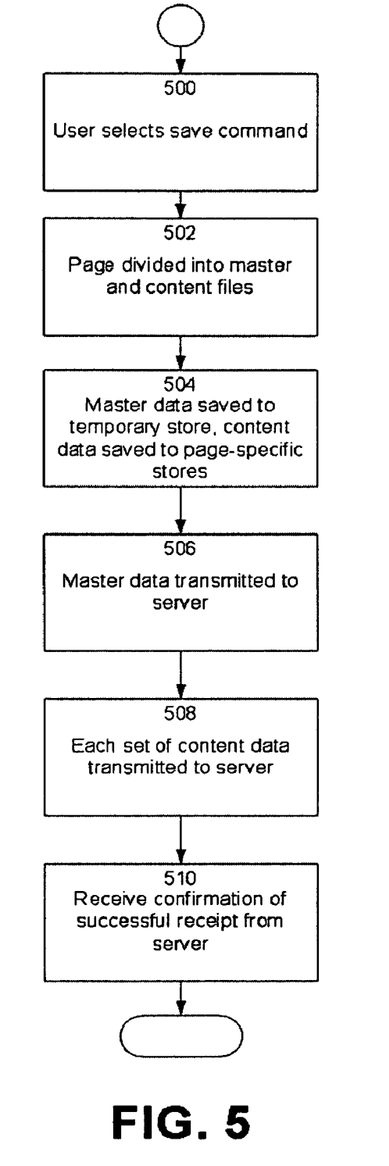
FIG. 5 is a flow chart of a process of transferring master and content page data to a web server during a save process in accordance with one embodiment of the invention.

FIG. 5 illustrates a process for uploading an edited master/content page to the server. In the embodiment of FIG. 5, the master page data and each content page's data are transmitted separately from the client to the server and stored in separate files on the web server 102. In act 500, the user enters a command to save the data to the web server 102. After receiving this command, the code on the client that implements the browser-based web authoring tool (in act 502) the web page for the aforementioned indications of master and content divisions. Once the determination of where the divisions lie is made, in act 504 the content is saved to separate temporary stores on the client. In act 506, the master page's content is transmitted to the server, followed by a separate transmittal of the content pages' content in act 508. In act 510, the client 104 receives a confirmation from the web server 102 that all content has been received correctly, and the save process terminates.

It should be appreciated that the sequence of acts of this embodiment is merely illustrative, as other sequences are possible. For example, rather than the master page being sent before the content pages, the content pages could be sent first. Alternative embodiments may implement different acts. For example, the integrated web page could be transmitted to the web server without being parsed by the client, as disclosed above.

In one embodiment, if a user loads previously-created web page data from the web server 102 for a web page including a master and at least one content page, the pages are downloaded separately to the client and the code on the client that implements the browser-based web authoring tool parses the received master page and content page(s) to determine how to display the integrated page in the WYSIWYG editor and render it accordingly. Rendering the page refers to determining how to display data to the user, and may comprise refreshing the display, either in whole or in part. The authoring tool code edits the data describing how the web page should appear (e.g., the HTML), and triggers the browser to display the web page.

In an alternate embodiment, the web server 102 may examine and merge the master and content pages appropriately before transmission to the client, such that the client terminal 104 receives an integrated web page that does not need to be manipulated before being displayed to the user.

It should be appreciated that the process illustrated in the flowcharts of FIGS. 4 and 5 are merely illustrative, and that other implementations are possible. For example, the acts depicted can be implemented in a different order, examples of which were discussed earlier.

In one embodiment of the invention, an edited web page may not be uploaded directly to (e.g., via the process of FIG. 5) or downloaded directly from the web server 102, but may be uploaded to or downloaded from another device such as a file server.

The transfer of data between the web server 102 (and/or file server) and the client terminal 104 may be performed using any suitable technique. In one embodiment, data transfer is conducted using the Extensible Markup Language (XML) and the XMLHTTPRequest command suite. Using XML's tag system, data can be enclosed by tags indicating what data is stored therein, to allow the receiver to process what data it is receiving and determine how to process it further.

In some web pages, such as some developed using the ASP.NET web programming language, there may be data and tags that are intended for use by the web server and cannot be understood by a traditional client-side XML parser. Such ASP.NET tags may constitute server-side directives that are only understood by server-side ASP.NET-compatible XML parsers. Examples of these tags may include tags delineating master and content pages within a web page. Conventionally, when a web browser requests from a web server a page that includes master and content pages, the web server examines the tags, processes the page data as instructed, and strips the tags from the pages before transmittal (e.g., downloads a page to the browser with the master and content pages integrated into a single page). Thus, conventional browsers typically are unaware that these server-side tags exist and need not have the capability to process them.

Applicants have appreciated that for the embodiments of the browser-based web authoring tool wherein master and content pages are downloaded directly to the client for combining at the client, one or more of those pages may include format tags that are intended for the server and may not be recognized by traditional browsers. Thus, in one embodiment of the invention, the code (e.g., JavaScript) of the browser-based web authoring tool strips out these tags when the web pages are received from the server, before passing the data to the browser's XML parser. In this way, the server-side directives that may not be understood by the client-side XML parser will be removed before causing errors. In one embodiment an original copy of each file from which tags are stripped is maintained, and these files are updated during the editing process and uploaded to the server, such that these server-side directives are not lost during editing.

Examining a file and removing server-side directive tags before passing the page to an XML parser is only one illustrative technique for handling data (e.g., identifying tags) that may not be understood by the web browser. Any suitable technique may be used. For example, in an alternative embodiment, the tool may pass an un-processed web page file to the XML parser and monitor the parsing process for errors. If an error is produced, it may catch the error and handle it appropriately (e.g., stripping out the data at that point, or replacing the error-producing data with data that may be understood by the parser).

In one embodiment of the invention, the server may integrate the master and content pages before transmission so that the client receives a file that does not need to be analyzed or stripped of any data.

In an alternative embodiment of the invention, the web-based authoring tool is used in conjunction with a web browser that is able to understand and process server-side directives without error. In this embodiment, stripping of these tags would not be necessary and this act may not be performed.

It should be appreciated that the embodiments of the invention discussed herein are not limited to transferring data using XML and XMLHTTPRequest or any other method of data exchange, as any suitable technique may be employed.

Figure 6A:
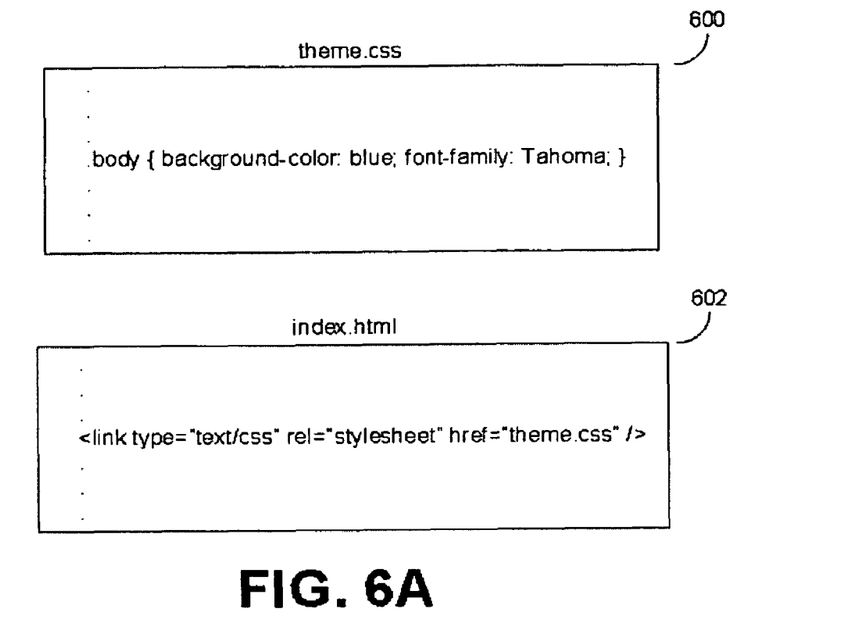
FIG. 6A shows a web page using a style sheet to determine display properties and the associated style sheet.

In another embodiment of the invention, techniques are employed to reduce the number of times that a web page is reloaded from the server during editing when style sheets are employed. Any suitable style format may be used in accordance with this embodiment of the invention. An exemplary implementation is Cascading Style Sheets. Cascading Style Sheets (CSS) are a popular, conventional form of editing the display options of various elements of a web page. A CSS theme file could, for example, instruct the web browser to render all hyperlinks in a page in red text instead of a default blue. In this way, the web page author does not have to edit the display options of every hyperlink, but merely include a reference to the style sheet. As an example, FIG. 6A shows a CSS file 600 that instructs the reading web browser to render the page background color blue and display default fonts in Tahoma. The index.html file 602 for the page then includes a reference to the theme.css file 600 such that the browser knows to retrieve the theme.css file 600 from the web server 102 and apply the display options stored therein when rendering the index.html file 602.

In conventional browser-based tools, this model persists throughout the editing process. Since the style information is stored in a separate file, each time the page 602 is refreshed (such as after a content or style edit is made), the web browser retrieves the associated theme file 600 from the server. This necessitates that the browser upload any changed style information to the server such that it can be retrieved in this way. Thus, each time a style change is made, two transfers need to be made between the client and the server. These transfers result in delays and interrupted use of the conventional tools.

Figure 6B:
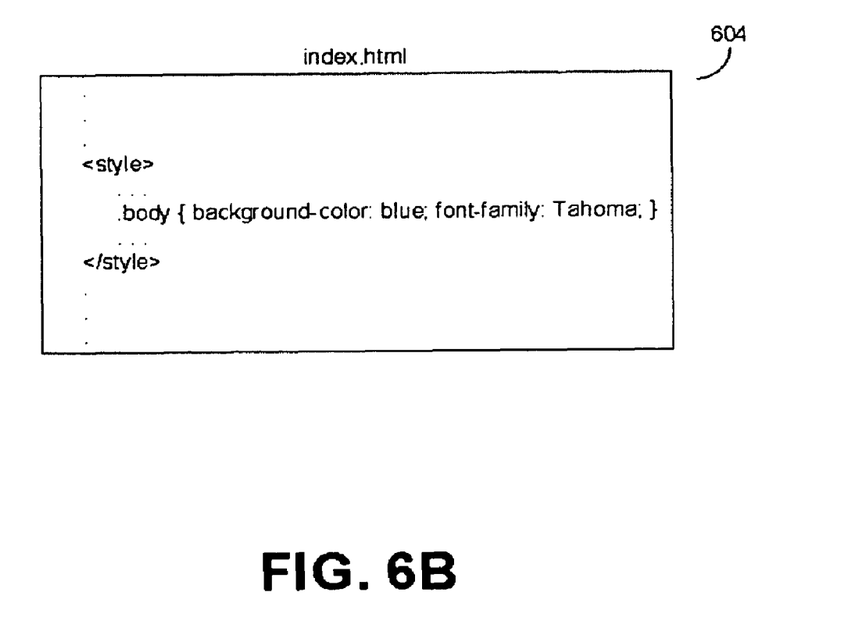
FIG. 6B illustrates the web page of FIG. 6A but where the style sheet data is converted to an inline style block and inserted into the web page according to one embodiment of the invention.

In one embodiment of the invention, a browser-based web authoring tool is provided that reduces exchanges between the client and server when a user edits a web page having a style sheet. In one embodiment, when a user selects to open a web page from the web server 102 for editing, the system receives the CSS file, parses out the relevant style data for that page, and inserts the style data into the web page in the form of an inline style block. An example of a resulting page is shown in FIG. 6B as index.html 604. User-entered edits may then be reflected directly in the page itself by editing this inline style block. In this way, future refreshes may be done locally, without an additional style file (e.g., the theme file) being retrieved from the server. Thus, transfer delays to retrieve a separate style file from the server may be avoided.

The creation of an inline style block can be implemented in any suitable manner. For example, in accordance with one embodiment of the invention, a user may input a command to create a style sheet for a web page. In response, the authoring tool may insert an inline style block (e.g., in HTML) into the web page instead of creating a separate CSS file. Thereafter, any desired style manipulations may be written to the inline style block, and the page may be refreshed using the inline style block to achieve WYSIWYG editing without experiencing refresh delays following style updates.

When the user elects to save the web page, in accordance with one embodiment of the invention the inline style block is parsed out of the edited page to create a separate style file that is transferred to the web server 102. The web server may then store this data in a separate style file (e.g., in the form of a Cascading Style Sheet or otherwise). The web page data may also be edited to include a reference to the style file. In this way, the final product reflected on the web server may match the model of FIG. 6A. Thus, when a browser subsequently loads the web page for viewing, the style data is referenced appropriately and can be downloaded and applied.

As with the embodiment relating to master and content pages, the embodiment of the invention directed to use of an inline style block is not limited to any specific techniques for transferring style data between the client and the web server 102. The web page and style data may not be directly transferred to the web server 102 and instead may be transferred to a third device (e.g., a file server). In addition, in an alternate embodiment, the creation of an inline style block from a theme file or the creation of a theme block may take place on the web server, instead of on the client. In one embodiment of the invention, the parsing of the inline style block to a theme file may not occur automatically before transmission or storage, but may only occur when a user enters a command to perform the parsing.

Although CSS theme files are described above as an example of style data that can be converted to a format for local editing, it should be understood that the aspect of the invention relating to enabling local editing and refreshing of inline style data are not limited to being performed with Cascading Style Sheets or any other specific style schema. Similarly, this embodiment of the invention is not limited to converting style data to any specific type of structure for rendering data locally.

Another embodiment of the invention relates to techniques for using a browser-based tool to create and edit web pages that include controls, including, for example, the type used in the ASP.NET web programming language. In conventional client-based web authoring tools, an ASP.NET control library must be installed on a user's computer to enable the control library to be used in creating or editing a web page. These control libraries typically outline various options available to the user in implementing the control, and contain computer-executable instructions for translating those options into specific implementations. As an example, a map control may require information informing it of the location at which to display a map, the zoom level to display it at, and the size of the map to generate to produce content to insert into a web page. The library has the capability to query for at least these options, to create a map of the size desired, and to retrieve the map data.

The above-described map control is merely example of the types of controls that can be employed with the embodiment relating to locally creating pages with controls. This embodiment of the invention is not limited to use with any particular ASP.NET control or even to using controls in this format, as it can be used with any type of control.

In one embodiment of the invention, a browser-based web authoring tool is employed that can create a web page that includes one or more control libraries without installing the control library on the client machine. This can be done in any suitable way and is not limited to any particular implementation technique.

Figure 7:
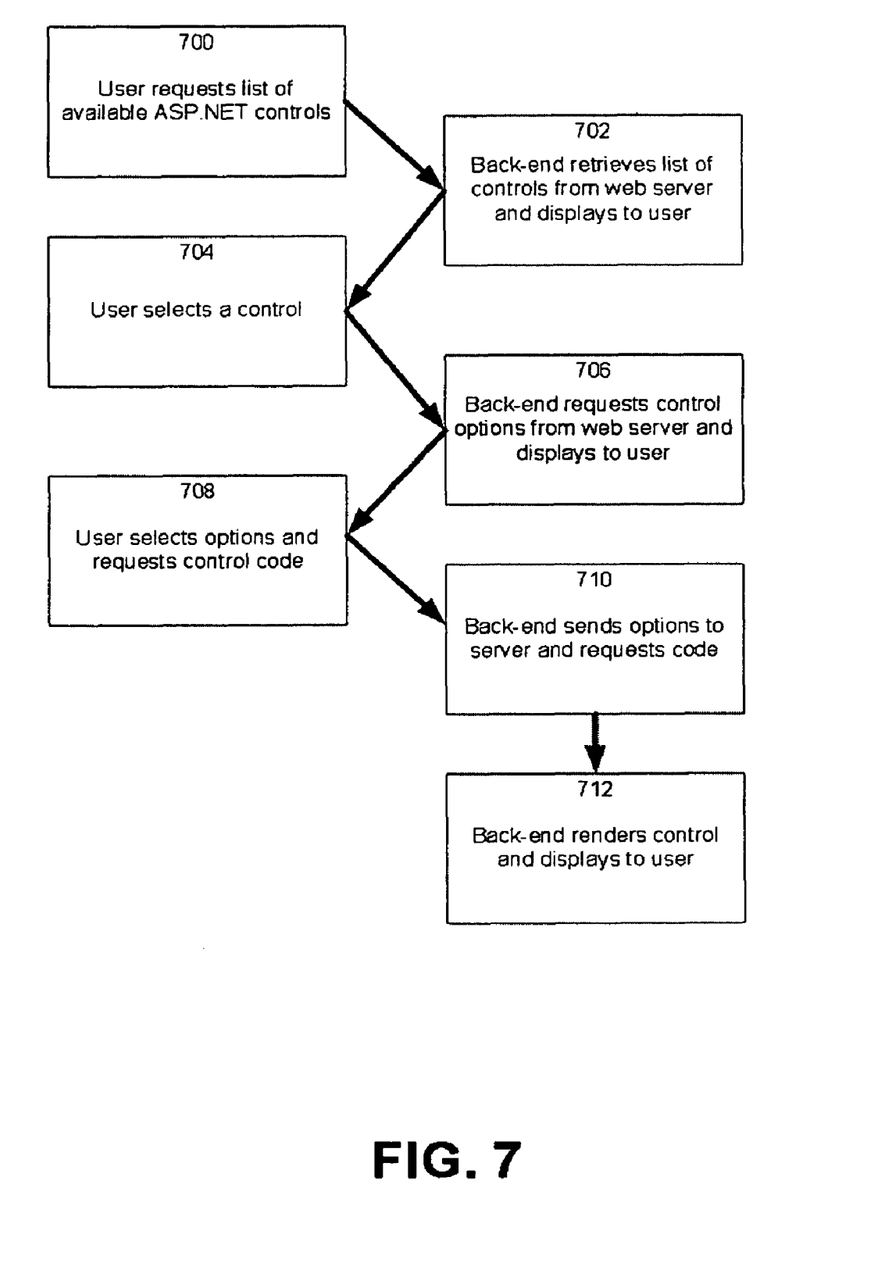
FIG. 7 is a flowchart illustrating how one embodiment of the invention interacts with a web server to insert an ASP.NET control into a web page.

In one illustrative implementation shown in FIG. 7, a user requests a list of available controls in act 700. In response, the tool can retrieve a list from the web server in act 702. From this list, the user can (in act 704) select a control for addition to a web page.

Once a control is selected, the web page may prompt the user for any options associated with the control. This prompting can be done in any suitable manner, as can the retrieval of these options. As an example, the options may be derived from a previously-retrieved cache of the options, or (as shown in act 706) by retrieving the options from the web server 102. Once any options are selected by the user in act 708, the selection information input by the user is transferred from the browser to the web server 102 in act 710. The web server 102 uses the input information to create code implementing an instance of the control as specified by the user's selections. This code is then transferred back to the client terminal 104, where it is inserted into the user's web page and the display is refreshed in act 712. Following the refresh, the web page being edited by the user will display the requested control according to the user's selected options. In the above-described exemplary map control, upon refresh the web page will be rendered with a map at the location and zoom specified by the user, and of the size specified by the user. In this way, the user can make use of an ASP.NET control without first having to install it locally.

If a user elects to make a change to the options defining a control, in one embodiment of the invention an updated set of options may be transferred to the web server and a new instance of the control received from the web server. Alternatively, the code on the client may be able to edit the control using pre-retrieved code. For other edits (e.g., a user edits the web page surrounding the control or merely edits the placement of the control on the web page), the web authoring tool may handle such edits locally and without needing to retrieve information from the server.

Also, when a user elects to save the web page, or when a user loads a previously-created web page comprising a control, the browser need not send or retrieve the code describing the control from the server separate from the page it is in, since the control has become a part of the page just like an image or table object.

It should be appreciated that the process illustrated in the flowchart of FIG. 7 is merely illustrative, and that the embodiment of the invention directed to editing pages with controls is not limited to this process. For example, in one embodiment of the invention, data concerning the control may not be retrieved directly from web server 102 but may be retrieved from another device (e.g., a file server). In one embodiment, the list of available controls may be retrieved in ways other than in response to a user request (e.g., when the authoring tool is downloaded or otherwise). Similarly, the options concerning a control may be retrieved other than in response to the control being selected (e.g., may be retrieved along with the control).

Several embodiments of the invention have been described above that provide a browser-based web authoring tool that can edit web pages using master and content pages, can employ inline style blocks, and can allow editing of a page with controls without installing the control(s) locally. In various embodiments, these capabilities can be implemented separately. Alternatively, in other embodiments, an authoring tool can be provided that employs any two, or alternatively all three of these capabilities together.

The above-described embodiments of the present invention can be implemented in any of numerous ways. For example, the embodiments may be implemented using hardware, software, or a combination thereof. When implemented in software, the software code can be executed on any suitable processor or collection of processors, whether provided in a single computer or distributed among multiple computers.

Further, it should be appreciated that a computer or terminal may be embodied in any of a number of forms, such as a rack-mounted computer, a desktop computer, a laptop computer, or a tablet computer. Additionally, a computer or terminal may be embedded in a device not generally regarded as a computer but with suitable processing capabilities, including a Personal Digital Assistant (PDA), a smart phone, or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface including keyboards, and pointing devices, such as mice, touch pads, and digitizing tables. As another example, a computer may receive input information through speech recognition or in other audible formats.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks, or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for editing web pages, the method comprising:
   downloading, via a web browser-based website creation tool, a web page from a web server to a client computer, the web page having a reference to a style sheet stored on the web server, the style sheet including style data for content of the web page;
   downloading, via the web browser-based website creation tool, the style sheet from the web server to the client computer;
   parsing, from the style sheet, the style data for the content of the web page;
   creating, by the web browser-based website creation tool, an inline style block within the web page, the inline style block including the style data for the content of the web page parsed from the style sheet, wherein the inline style block within the web page replaces the reference to the style sheet for local rendering of the web page on the client computer as defined by the style data for the content of the web page parsed from the style sheet;
   editing, via the web browser-based website creation tool, the inline style block within the web page to change the style data for the content of the web page;
   rendering the web page locally on the client computer as defined by the edited inline style block;
   parsing, by the web browser-based website creation tool, the edited inline style block from the web page in response to a user request to save the web page;
   creating, by the web browser-based website creation tool, a new style sheet from the edited inline style block parsed from the web page; and
   editing, via the web browser-based website creation tool, the web page to include a reference to the new style sheet.

2. The method of claim 1, further comprising:
   uploading, via the web browser-based website creation tool, the new style sheet to the web server.

3. The method of claim 1, further comprising:
   editing, via the web browser-based website creation tool, the content of the web page locally on the client computer; and
   uploading, via the web browser-based website creation tool, the web page comprising the edited content to the web server.

4. The method of claim 1, further comprising:
   rendering the web page locally on the client computer, as defined by the style data for the content of the web page parsed from the style sheet, prior to editing the inline style block within the web page to change the style data for the content of the web page.

5. The method of claim 1, wherein editing the inline style block comprises adding at least one new style characteristic for the content of the web page.

6. The method of claim 1, wherein the style sheet is a Cascading Style Sheet.

7. The method of claim 1, wherein the inline style block comprises a Hypertext Markup Language (HTML) inline style block enclosed by tags.

8. A computer-readable storage medium encoded with instructions for execution on a computer, wherein the instructions, when executed, cause the computer to perform a method for editing web pages, the method comprising:
   downloading, via a web browser-based website creation tool, a web page from a web server to the computer, the web page having a reference to a style sheet stored on the web server, the style sheet including style data for content of the web page;
   downloading, via the web browser-based website creation tool, the style sheet from the web server to the computer;
   parsing, from the style sheet, the style data for the content of the web page;
   creating, by the web browser-based website creation tool, an inline style block within the web page, the inline style block including the style data for the content of the web page parsed from the style sheet, wherein the inline style block within the web page replaces the reference to the style sheet for local rendering of the web page on the computer as defined by the style data for the content of the web page parsed from the style sheet;
   editing, via the web browser-based website creation tool, the inline style block within the web page to change the style data for the content of the web page;
   rendering the web page locally on the computer as defined by the edited inline style block;
   parsing, by the web browser-based website creation tool, the edited inline style block from the web page in response to a user request to save the web page;
   creating, by the web browser-based website creation tool, a new style sheet from the edited inline style block parsed from the web page; and
   editing, via the web browser-based website creation tool, the web page to include a reference to the new style sheet.

9. The computer-readable storage medium of claim 8, wherein the method further comprises:
   uploading, via the web browser-based web site creation tool, the new style sheet to the web server.

10. The computer-readable storage medium of claim 8, wherein the method further comprises:
   editing, via the web browser-based website creation tool, the content of the web page locally on the computer; and
   uploading, via the web browser-based website creation tool, the web page comprising the edited content to the web server.

11. The computer-readable storage medium of claim 8, wherein editing the inline style block comprises adding at least one new style characteristic for the content of the web page.

12. The computer-readable storage medium of claim 8, wherein the method further comprises:
   rendering the web page locally on the computer, as defined by the style data for the content of the web page parsed from the style sheet, prior to editing the inline style block within the web page to change the style data for the content of the web page.

13. The computer-readable storage medium of claim 8, wherein the style sheet is a Cascading Style Sheet.

14. The computer-readable storage medium of claim 8, wherein the inline style block comprises a Hypertext Markup Language (HTML) inline style block enclosed by tags.

15. A computing device comprising:
   a processor configured to execute computer-executable instructions; and
   memory storing computer-executable instructions for:
      downloading, via a web browser-based website creation tool, a web page from a web server to the computing device, the web page having a reference to a style sheet stored on the web server, the style sheet including style data for content of the web page;
      downloading, via the web browser-based website creation tool, the style sheet from the web server to the computing device;
      parsing, from the style sheet, the style data for the content of the web page;
   creating, by the web browser-based website creation tool, an inline style block within the web page, the inline style block including the style data for the content of the web page parsed from the style sheet, wherein the inline style block within the web page replaces the reference to the style sheet for local rendering of the web page on the computing device as defined by the style data for the content of the web page parsed from the style sheet;
   editing, via the web browser-based website creation tool, the inline style block within the web page to change the style data for the content of the web page;
   rendering the web page locally on the computing device as defined by the edited inline style block;
   parsing by the web browser-based website creation tool, the edited inline style block from the web page in response to a user request to save the web page;
   creating, by the web browser-based website creation tool, a new style sheet from the edited inline style block parsed from the web page; and
   editing, via the web browser-based website creation tool, the web page to include a reference to the new style sheet.

16. The computing device of claim 15, the memory further storing computer-executable instructions for:
   editing, via the web browser-based website creation tool, the content of the web page locally on the computing device; and
   uploading, via the web-browser-based website creation tool, the web page comprising the edited content to the web server.

17. The computing device of claim 15, the memory further storing computer-executable instructions for:
   uploading, via the web browser-based website creation tool, the new style sheet to the web server.

18. The computing device of claim 15, wherein editing the inline style block comprises adding at least one new style characteristic for the content of the web page.

19. The computing device of claim 15, the memory further storing computer-executable instructions for:
   locally rendering the web page on the computing device, as defined by the style data for the content of the web page parsed from the style sheet, prior to editing the inline style sheet to change the style data for the content of the web page.

20. The computing device of claim 15, wherein the inline style block comprises a Hypertext Markup Language (HTML) inline style block enclosed by tags.

* * * * *